United States Patent
Tyagi et al.

(10) Patent No.: US 10,140,979 B2
(45) Date of Patent: Nov. 27, 2018

(54) MODELING A CLASS POSTERIOR PROBABILITY OF CONTEXT DEPENDENT PHONEMES IN A SPEECH RECOGNITION SYSTEM

(71) Applicant: Conduent Business Services, LLC, Dallas, TX (US)

(72) Inventors: Vivek Tyagi, New Delhi (IN); Niranjan Aniruddha Viladkar, Maharashtra (IN); Theja Tulabandhula, Karnataka (IN)

(73) Assignee: CONDUENT BUSINESS SERVICES, LLC, Dallas, TX (US)

( * ) Notice: Subject to any disclaimer, the term of this patent is extended or adjusted under 35 U.S.C. 154(b) by 135 days.

(21) Appl. No.: 15/233,582

(22) Filed: Aug. 10, 2016

(65) Prior Publication Data
US 2018/0047388 A1 Feb. 15, 2018

(51) Int. Cl.
*G10L 15/16* (2006.01)
*G06N 3/08* (2006.01)
(Continued)

(52) U.S. Cl.
CPC .............. *G10L 15/16* (2013.01); *G06N 7/005* (2013.01); *G10L 15/063* (2013.01); *G10L 15/14* (2013.01)

(58) Field of Classification Search
CPC .................................. G10L 15/16; G06N 3/08
(Continued)

(56) References Cited

U.S. PATENT DOCUMENTS

2013/0018832 A1* 1/2013 Ramanathan ............ G06N 3/08
706/25
2016/0260014 A1* 9/2016 Hagawa ............... G06K 9/4628
(Continued)

OTHER PUBLICATIONS

Siniscalchi, Sabato Marco, et al. "Exploiting deep neural networks for detection-based speech recognition." Neurocomputing 106 (2013): 148-157.*
(Continued)

*Primary Examiner* — Edwin S Leland, III
(74) *Attorney, Agent, or Firm* — Jones Robb, PLLC (57) ABSTRACT

What is disclosed is a system and method for modelling a class posterior probability of context dependent phonemes in a speech recognition system. A representation network is trained by projecting a N-dimensional feature vector into G intermediate layers of nodes. At least some features are associated with a class label vector. A last intermediate layer $Z^G$ of the representation network is discretized to obtain a discretized layer $\hat{Z}$. Feature vector Q is obtained by randomly selecting V features from discretized layer $\hat{Z}$. Q is repeatedly hashed to obtain a vector $Q_f$ where $Q_f$ is an output of the $f^{th}$ hashing. An equivalent scalar representation is determined for each $Q_f$. In a manner more fully disclosed herein, a posterior probability $P_f$ is determined for each (x, b) pair based on the equivalent scalar representation of each respective $Q_f$. The obtained posterior probabilities are used to improve classification accuracy in a speech recognition system.

32 Claims, 4 Drawing Sheets

(51) Int. Cl.
*G10L 15/06* (2013.01)
*G06N 7/00* (2006.01)
*G10L 15/14* (2006.01)

(58) Field of Classification Search
USPC .......................................................... 704/232
See application file for complete search history.

(56) References Cited

U.S. PATENT DOCUMENTS

| | | | | |
|---|---|---|---|---|
| 2016/0328643 | A1* | 11/2016 | Liu ........................ | G06N 3/084 |
| 2017/0161606 | A1* | 6/2017 | Duan ....................... | G06N 3/08 |
| 2017/0169331 | A1* | 6/2017 | Garner .................... | G06N 3/082 |
| 2018/0053085 | A1* | 2/2018 | Matsumoto .............. | G06N 3/04 |
| 2018/0060511 | A1* | 3/2018 | Sato ....................... | G06F 19/345 |

OTHER PUBLICATIONS

Siniscalchi, Sabato Marco, Torbjorn Svendsen, and Chin-Hui Lee. "An artificial neural network approach to automatic speech processing." Neurocomputing 140 (2014): 326-338.*

Dahl, George E., et al. "Context-dependent pre-trained deep neural networks for large-vocabulary speech recognition." IEEE Transactions on audio, speech, and language processing 20.1 (2012): 30-42.*

Zhong, G., et al., "A Deep Hashing Learning Network", Jul. 16, 2015, found on http://arxiv.org/abs/1507.04437.

Renals, S., "(Deep) Neural Networks", Automatic Speech Recognition—ASR Lecture Slides 14 & 15. Mar. 18, 2013.

Chen, W., et al., "Compressing Neural Networks with the Hashing Trick", CoRR, abs/1504.04788. Apr. 14, 2015.

Hinton, G., et al., "Deep Neural Networks for Acoustic Modeling in Speech Recognition", IEEE Signal Processing Magazine vol. 29, No. 6.

Do, T., et al., "Discrete Hashing with Deep Neural Network" arXiv preprint arXiv:1508.07148. Aug. 28, 2015.

Atiya, A., et al., "Estimating the Posterior Probabilities Using the K-Nearest Neighbor Rule" Jul. 19, 2004.

Liu, W., "Hashing by Deep Learning".

Zhang, G., "Neural Networks for Classification: A Survey", IEEE Transactions on Systems, Man, and Cybernetics—Part C: Applications and Reviews, Nov. 2000, pp. 451-462, vol. 30, No. 4.

Zhang, Z., et al., "Supervised Hashing with Deep Neural Networks", arXiv preprint arXiv:1511.04524. Nov. 14, 2015.

Yang, H-F., et al., "Supervised Learning of Semantics-Preserving Hashing via Deep Neural Networks for Large-Scale Image Search", arXiv preprint arXiv:1507.00101. Jul. 1, 2015.

* cited by examiner

MODELING A CLASS POSTERIOR PROBABILITY OF CONTEXT DEPENDENT PHONEMES IN A SPEECH RECOGNITION SYSTEM

TECHNICAL FIELD

The present invention is directed to systems and methods which model a class posterior probability of context dependent phonemes to improve classification accuracy in a speech recognition system.

BRIEF SUMMARY

What is disclosed is a system and method for modelling a class posterior probability of context dependent phonemes to improve classification accuracy in a speech recognition system. A representation network is utilized comprising an input layer of N nodes and G intermediate layers of nodes. Each intermediate layer has $N_g$ nodes, where $g \in (1, G)$ and $G \geq 2$. All edges of all nodes of the input layer are connected to all nodes of the first intermediate layer. All edges of all nodes of each intermediate layer are connected to all nodes of a next successive intermediate layer. At least one processor executes machine readable program instructions which configure the processor to receive a N-dimensional feature vector $x_1, x_2, \ldots, x_N$ and a respective M-dimensional class label vector $b_1, b_2, \ldots, b_M$, where (x, b) represents the $x^{th}$ feature and its label. The processor initializes the representation network by assigning a feature to each node of the input layer of the representation network. The representation network is then trained by the processor progressively computing discriminative features for all nodes of each intermediate layer based on features of nodes in each preceding layer. Once the representation network is trained, features of all nodes of the last intermediate layer $Z^G$ are discretized into E-intervals to obtain a vector $\hat{Z}$ of dimension $N_G$, where $E \geq 2$. A vector $Q=(q_1, q_2, \ldots, q_V)$ is then generated by the processor randomly selecting V features from layer $\hat{Z}$, where $V \in (1, N_G)$. Thereafter, for $f=1$ to F, the vector Q is hashed to generate $Q_f=(q_1^f, q_2^f, \ldots, q_V^f)$, where $Q_f$ is a result of the $f^{th}$ hashing, and $F \geq 2$. In a manner more fully disclosed herein, an equivalent scalar representation is determined for each $Q_f$ and a posterior probability $P_f$ is determined for each (x, b) pair in f based on the scalar representation of each respective $Q_f$. The posterior probabilities are used to improve context dependent phoneme classification accuracy in a speech recognition system.

Features and advantages of the above-described system and method will become readily apparent from the following detailed description and accompanying drawings.

BRIEF DESCRIPTION OF THE DRAWINGS

The foregoing and other features and advantages of the subject matter disclosed herein will be made apparent from the following detailed description taken in conjunction with the accompanying drawings, in which.

DETAILED DESCRIPTION

What is disclosed is a system and method for modelling a class posterior probability of context dependent phonemes to improve classification accuracy in a speech recognition system.

Figure 1:
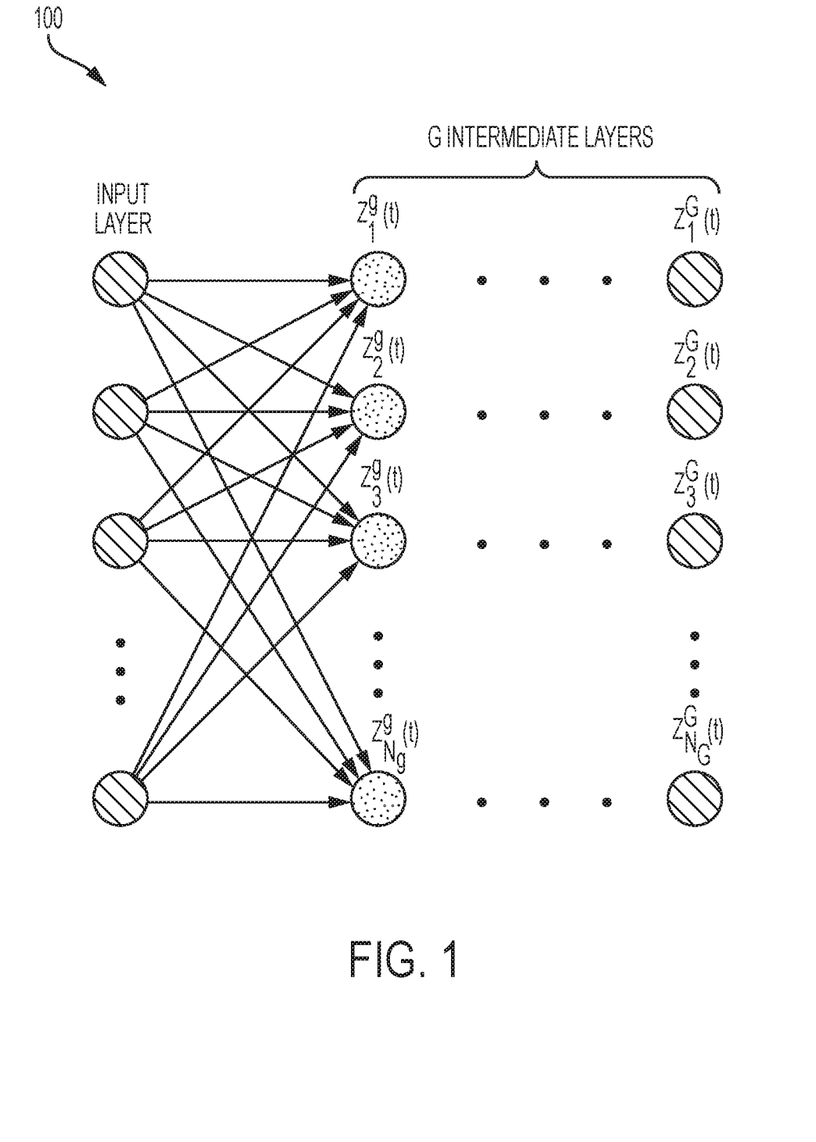
FIG. 1 shows an illustrative representation network, as used herein.

A "representation network", as used herein, comprises a hyper-rectangular array of nodes having an input layer of N nodes and G intermediate layers of nodes. Each intermediate layer has $N_g$ nodes, where $g \in (1, G)$ and $G \geq 2$. All edges of all nodes of the input layer are connected to all nodes of a first intermediate layer. All edges of all nodes of each intermediate layer are connected to all nodes of a next successive intermediate layer. The $i^{th}$ node of the $g^{th}$ intermediate layer is given by $Z^g$. The last intermediate layer has nodes $z_1^G, z_2^G, \ldots, z_{N_g}^G$. FIG. 1 shows an example representation network 100 with G intermediate layers of nodes. The representation network may be configured dynamically based on the dimensionality of the received feature vector, be already resident in memory, or pre-configured and retrieved from a storage device or a remote device over a network.

A "feature vector" is a N-dimensional vector x, as is generally understood, with features $x_1, x_2, \ldots, x_N$. The feature vector has an associated M-dimensional class label vector.

A "class label vector" is a M-dimensional vector b, as is generally understood, with class labels $b_1, b_2, \ldots, b_M$. The feature/label pair (x, b) represents the $x^{th}$ feature and its label. The $k^{th}$ class label has a value of 1 if the class of the feature vector equals k and 0 otherwise, where $k \in (1, M)$. Not all features have a label. Since the teachings hereof are intended to utilize a wide array of feature vectors and respective class labels, a discussion as to a particular feature vector has been omitted. The feature vector and respective class label vector are received.

"Receiving a feature vector and a respective class vector" is intended to be widely construed and includes retrieving, capturing, acquiring, or otherwise obtaining a feature vector and a respective class vector. Such vectors can be received or retrieved from a memory or storage device such as a hard drive, flash drive, USB drive, or CDROM, or from a remote device over a network. Such vectors may be downloaded from a web-based system or application which makes a feature vector and a respective class vector available for processing in accordance with the methods disclosed herein. The feature vector is used to initialize the representation network.

"Initialize the representation network", as used herein, means to utilize at least one processor executing machine readable program instruction to assign one feature of the feature vector to each node of the input layer of the representation network. Once the features have been assigned to the nodes of the input layer, the representation network is trained.

"Train the representation network", as used herein, means to utilize at least one processor executing machine readable program instruction to compute a discriminative feature for all nodes of each successive layer based on features of nodes in each preceding layer of the representation network.

A "discriminative feature" is computed for all nodes of all intermediate layers. For the $i^{th}$ node of the $g^{th}$ intermediate layer, the discriminative feature is as follows:

$$a_i^g = \sum_{j=1}^{N_g-1} w_{i,j}^g \cdot Z_j^{g-1} + d_i^g \quad (1)$$

$$Z_i^g = \frac{1 - \exp(a_i^g)}{1 + \exp(a_i^g)} \quad (2)$$

where $w_{i,j}^g$ is the weight applied to edges connecting the $i^{th}$ node of the $g^{th}$ layer to the $j^{th}$ edge of all nodes of the preceding layer, and $d_j^g$ is a bias term. In one embodiment, the bias term is user-defined.

"Discretize" means generally to divide into discrete parts. As used herein, the features of nodes of the last intermediate layer of the trained representation network, given by $Z^G$, are discretized into E-intervals to obtain an E-ary layer of dimension $N_G$, denoted $\hat{Z}$, where $E \geq 2$. In one embodiment, $E \in (2, 3, \ldots, 10)$ and $N >> 10$.

"Hashing", as is generally understood, is a processor which utilizes a function to map a larger set into a smaller set ("buckets"). As used herein, V features are randomly selected from the $\hat{Z}$ and are hashed into $E^V$ buckets, where $V \in (1, N_G)$. In one embodiment, the hash function is given by:

$$h(Q) = \sum_{k=1}^{V} q_k * E^{k-1}. \quad (3)$$

An "equivalent scalar representation of $Q_f$", denoted $r_f$, is given by:

$$r_f(x) = \sum_{k=1}^{V} q_k^f * E^{k-1} \quad (4)$$

where $q_k^f$ is the $k^{th}$ feature of $Q_f$.

A "posterior probability" is the probability assigned to some parameter or to an event on the basis of its observed frequency in a sample, and calculated from a prior probability by Bayes' theorem. As used herein, the posterior probability, denoted $P_f(x, b)$ for a given $(x, b)$ pair computed for the $f^{th}$ hashing, is given by:

$$P_f(x, b) = \frac{U_f[r_f(x)][b]}{\sum_{d=1}^{M} U_f[r_f(x)][b]}. \quad (5)$$

where $U_f$ is an array of dimension $E^V$ xM with all locations in $U_f$ being initialized to 0 and each array location $U_f[r_f(x)][b]$ being set to 1, for each $(x, b)$ pair.

"Modeling a class posterior probability" of a M-dimensional vector $y_1, y_2, \ldots y_M$ means to approximate the probability that the label of x is one of the M labels it can take. So vector $(y_1, y_2, \ldots, y_M)$ approximates the probability that a given feature vector x has one of the M possible labels. For instance, if M=3, then a vector of value $y_1, y_2, y_3$=(0.2, 0.3, 0.5) models the probability that the given feature vector x has label 1 with probability 0.2, label 2 with probability 0.3 and label 3 with probability 0.5. In one embodiment, the representation network and the teachings hereof are used to model the posterior probabilities of context dependent phonemes to improve context dependent phoneme classification accuracy in a Hidden Markov Model based speech recognition system. The reader is directed to the text: "*Deep Neural Networks for Acoustic Modeling in Speech Recognition*", IEEE Signal Processing Magazine, No. 6, Vol. 29, pp. 82-97 (November 2012).

It should be appreciated that operative terms such as "receiving", "initializing", "training", "performing", "determining", "generating", "computing", "communicating", "discretizing", "hashing", "modeling", and the like, as used herein, include the application of any of a variety of techniques as well as mathematical operations according to any specific context or for any specific purpose. Such steps may be facilitated or otherwise effectuated by a microprocessor executing machine readable program instructions such that the intended functionality is effectively performed.

Flow Diagram of One Embodiment

Figure 2:
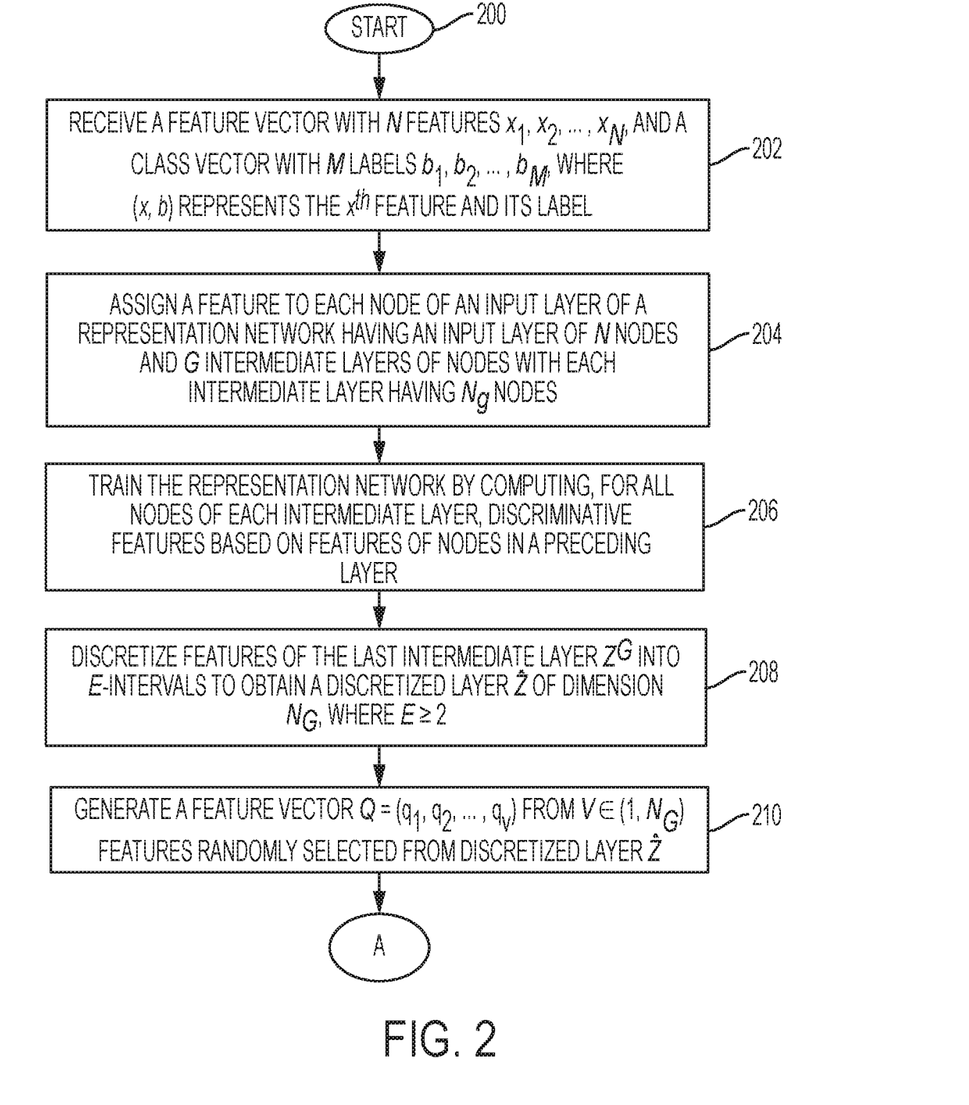
FIG. 2 is a flow diagram which illustrates one embodiment of the present method which uses the representation network of FIG. 1 to model a class posterior probability of context dependent phonemes in a speech recognition system.

Reference is now being made to the flow diagram of FIG. 2 which illustrates one embodiment of the present method which uses the representation network of FIG. 1 to model a class posterior probability of context dependent phonemes in a speech recognition system. Flow processing begins at step 200 and immediately proceeds to step 202.

At step 202, receive a feature vector with N features $x_1, x_2, \ldots, x_N$ and a respective class vector with M labels $b_1, b_2, \ldots, b_M$, where (x, b) represents the $x^{th}$ feature and its label.

At step 204, assign a feature to each node of an input layer of a representation network having an input layer of N nodes and G intermediate layers of nodes with each intermediate layer having $N_g$ nodes. An example representation network is shown in FIG. 1.

At step 206, train the representation network by computing, for all nodes of each intermediate layer, discriminative features based on features of nodes in a preceding layer.

At step 208, discretize features of last intermediate layer $Z^G$ into E-intervals to obtain a discretized layer $\hat{Z}$ of dimension $N_G$, where $E \geq 2$.

At step 210, generate a feature vector $Q=(q_1, q_2, \ldots, q_V)$ from $V \in (1, N_G)$ features randomly selected from discretized layer $\hat{Z}$.

Figure 3:
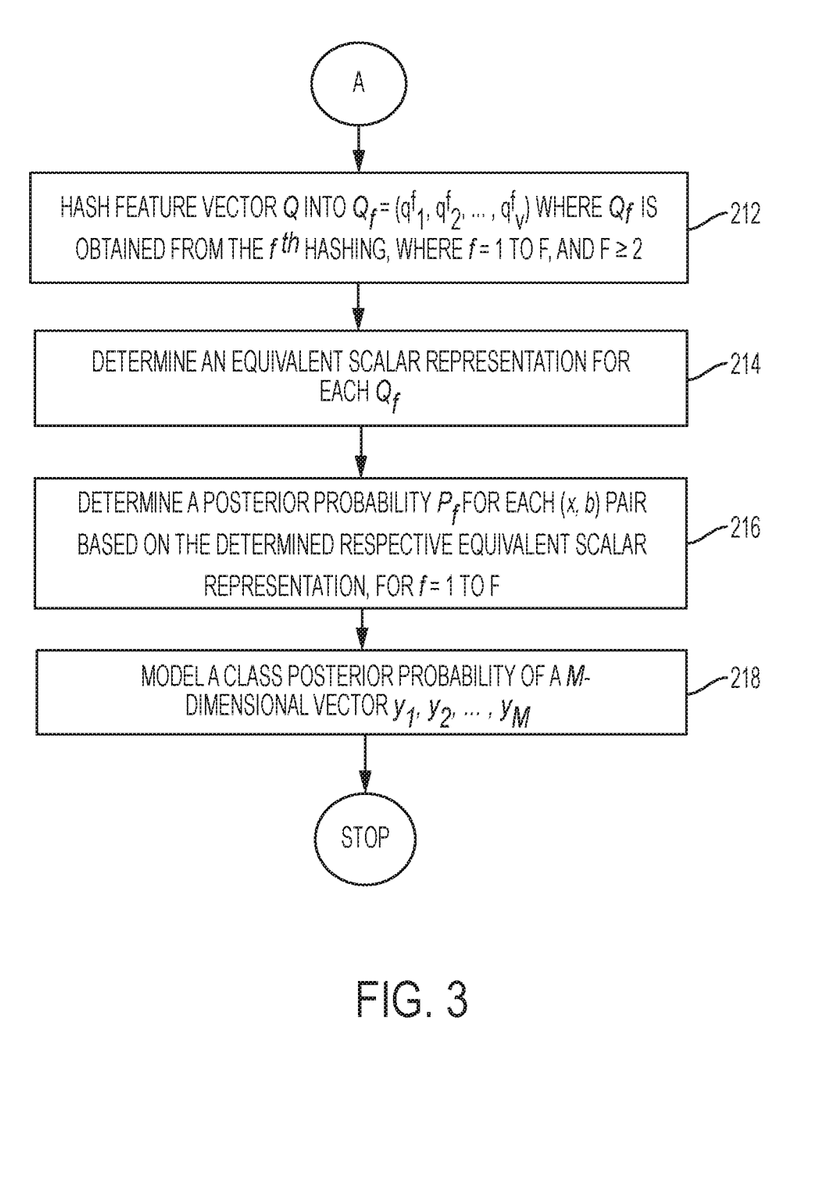
FIG. 3 is a continuation of the flow diagram of FIG. 2 with flow processing continuing with respect to node A.

Reference is now being made to FIG. 3 which is a continuation of the flow diagram of FIG. 2 with flow processing continuing with respect to node A.

At step 212, hash feature vector Q into $Q_f=(q_1^f, q_2^f, \ldots, q_V^f)$, where $Q_f$ is obtained from the $f^{th}$ hashing, where f=1 to F, and $F \geq 2$.

At step 214, determine an equivalent scalar representation for each $Q_f$.

At step 216, determine a posterior probability $P_f$ for each (x, b) pair based on the determined respective equivalent scalar representation, for f=1 to F.

At step 218, model a class posterior probability of a M-dimensional vector $y_1, y_2, \ldots, y_M$. In this embodiment, further processing stops. In another embodiment, the M-dimensional vector is used to model the posterior probabilities of context dependent phonemes to improve context dependent phoneme classification accuracy in a Hidden Markov Model (HMM) based speech recognition system. The determined posterior probabilities may be communicated to any of: a display device, a storage device, and a remote device over a network.

It should also be appreciated that the flow diagrams depicted herein are illustrative. One or more of the operations illustrated in the flow diagrams may be performed in a differing order. Other operations may be added, modified, enhanced, or consolidated. Variations thereof are intended to fall within the scope of the appended claims.

Block Diagram of Example System

Figure 4:
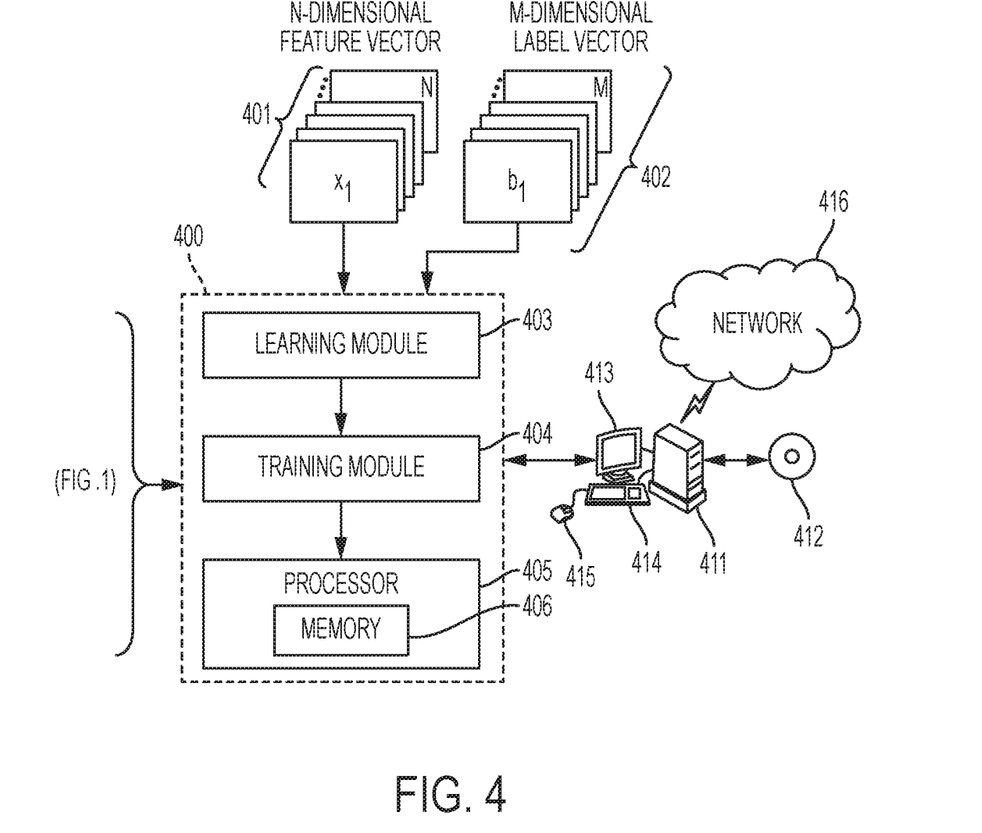
FIG. 4 shows a functional block diagram of one example system for performing various aspects of the present method as described with respect to the flow diagrams of FIGS. 2-3.

Reference is now being made to FIG. 4 which shows a block diagram of one example system 400 for performing various aspects of the present method as described with respect to the flow diagrams of FIGS. 2-3.

In FIG. 4, system 400 receives a N-dimensional feature vector and a M-dimensional class label vector (collectively at 401 and 402 as a plurality of individual elements for illustration purposes). System 400 is also in communication with the representation network 100 of FIG. 1 which may be in memory or accessed on a remote device. Learning Module 403 trains the representation network 100 by assigning a feature to each node of an input layer of the representation network. The Learning Module may further be configured to prune or manipulate the feature/label pairs, as desired, such that the representation network is trained with data which meet a pre-determined criteria. Once training has completed, Learning Module 403 signals Training Module 404 to train the representation network by progressively computing, for all nodes of each intermediate layer, discriminative features based on features of nodes in a preceding layer. Processor 405 retrieves machine readable program instructions from Memory 406 and is provided to facilitate the functionality the steps 208-218 discussed with respect to FIGS. 2 and 3. The processor may be further configured to perform additional steps as needed to fully implement the various embodiments disclosed herein. The processor, operating alone or in conjunction with other processors and memory, may be configured to assist or otherwise facilitate the functionality of any of the other modules of system 400.

The system of FIG. 4 is shown in communication with a workstation 411 which comprises, in part, a computer case housing various components such as a motherboard with a processor and memory, a network card, a video card, a hard drive capable of reading/writing to machine readable media 412 such as a floppy disk, optical disk, CD-ROM, DVD, magnetic tape, and the like, and other software and hardware needed to perform the functionality of a computer workstation. The workstation further includes a display device 413, such as a CRT, LCD, or touchscreen device, for displaying information, features, class labels, various computed values, interim results, and the like. A user can view any of that information and make a selection from menu options displayed thereon. Keyboard 414 and mouse 415 effectuate a user input such as, for instance, the random selection of features.

It should be appreciated that the workstation has an operating system and other specialized software configured to display alphanumeric values, menus, scroll bars, dials, slideable bars, pull-down options, selectable buttons, and the like, for entering, selecting, modifying, and accepting information needed for processing in accordance with the teachings hereof. The workstation is further enabled to display values as they are derived and may further be configured to display values computed for the nodes in the representation network, or enable a user to manipulate the progressive computation of values thereof. The workstation may further display the representation network in real-time as the system 400 performs its functionality. A user or technician may use the user interface of the workstation to set parameters, view/adjust/delete values used to train the representation network, and adjust various aspects of the system 400 as needed or as desired, depending on the implementation. Any of these selections or input may be stored/retrieved to storage device 412. Default settings can be retrieved from the storage device via pathways not shown.

Although shown as a desktop computer, it should be appreciated that the workstation can be a laptop, mainframe, or a special purpose computer such as an ASIC, circuit, or the like. The embodiment of the workstation is illustrative and may include other functionality known in the arts. Any of the components of the workstation may be placed in communication with the system 400 or any devices in communication therewith. Any of the modules of the system 400 can be placed in communication with computer readable media 412 and may store/retrieve therefrom data, variables, records, parameters, functions, and/or machine readable/executable program instructions, as needed to perform their intended functions. Each of the modules of the system 400 may be placed in communication with one or more remote devices over network 416. It should be appreciated that some or all of the functionality performed by any of the modules of the system 400 can be performed, in whole or in part, by the workstation placed. The embodiment shown is illustrative and should not be viewed as limiting the scope of the appended claims strictly to that configuration. Various modules may designate one or more components which may, in turn, comprise software and/or hardware designed to perform the intended function.

The teachings hereof can be implemented in hardware or software using any known or later developed systems, structures, devices, and/or software by those skilled in the applicable art without undue experimentation from the functional description provided herein with a general knowledge of the relevant arts. One or more aspects of the methods described herein are intended to be incorporated in an article of manufacture which may be shipped, sold, leased, or otherwise provided separately either alone or as part of a product suite or a service.

It will be appreciated that the above-disclosed and other features and functions, or alternatives thereof, may be desirably combined into other different systems or applications. Presently unforeseen or unanticipated alternatives, modifications, variations, or improvements may become apparent and/or subsequently made by those skilled in this art which are also intended to be encompassed by the following claims.

What is claimed is:

1. A computer implemented method for modeling a class posterior probability of context dependent phonemes in a Hidden Markov Model based speech recognition system, the computer implemented method comprising:

receiving a N-dimensional feature vector $x_1, x_2, \ldots, x_N$ with a respective M-dimensional class label vector $b_1, b_2, \ldots, b_M$, where (x,b) represents the $x^{th}$ feature and its label;

assigning a feature to each node of an input layer of a representation network comprising an input layer of N nodes and G≥2 intermediate layers of nodes with each intermediate layer having $N_g$ nodes, where g ∈(1, G), all edges of all nodes of the input layer being connected to all nodes of a first intermediate layer, all edges of all nodes of each intermediate layer being connected to all nodes of a next successive intermediate layer;

computing, for all nodes of each intermediate layer, discriminative features based on features of nodes in a preceding layer;

discretizing features of last intermediate layer $Z^G$ into E-intervals to obtain a discretized layer $\hat{Z}$, where E≥2;

generating a feature vector $Q=(q_1, q_2, \ldots, q_V)$ by randomly selecting $V \in (1, N_G)$ features from discretized layer $\hat{Z}$;

for f=1 to F, hashing Q into $Q_f=(q_1^f, q_2^f, \ldots, q_V^f)$, where $Q_f$ is obtained from the $f^{th}$ hashing, where $F \geq 2$;

determining an equivalent scalar representation for each $Q_f$;

for f=1 to F, determining a posterior probability $P_f$ for each (x, b) pair based on the determined respective equivalent scalar representation;

use the posterior probabilities to improve classification accuracy in the Hidden Markov Model based speech recognition system; and use the Hidden Markov Model based speech recognition system to recognize speech.

2. The computer implemented method of claim 1, wherein computing the discriminative feature for the $i^{th}$ node of the $g^{th}$ intermediate layer comprises:

$$a_i^g = \sum_{j=1}^{N_g-1} w_{i,j}^g * Z_j^{g-1} + d_i^g$$

$$Z_i^g = \frac{1 - \exp(a_i^g)}{1 + \exp(a_i^g)}$$

where $w_{i,j}^g$ is a weight applied to edges connecting the $i^{th}$ node of the $g^{th}$ intermediate layer to the $j^{th}$ edge of all nodes of a preceding layer, and $d_i^g$ is a bias term.

3. The computer implemented method of claim 1, wherein the hashing comprises:

$$h(Q) = \sum_{k=1}^{V} q_k * E^{k-1}.$$

4. The computer implemented method of claim 1, further comprising:

for f=1 to F, set all locations in an array $U_f[E^V][M]$ equal to 0; and for f=1 to F, set array location $U_f[r_f(x)][b]$ equal to 1, for each (x, b) pair.

5. The computer implemented method of claim 4, wherein the scalar representation of $Q_f$ for a given f comprises:

$$r_f(x) = \sum_{k=1}^{V} q_k^f * E^{k-1}$$

where $q_k^f$ represents the $k^{th}$ feature of $Q_f$.

6. The computer implemented method of claim 5, wherein determining the posterior probability $P_f$ for a given (x, b) pair comprises:

$$P_f(x, b) = \frac{U_f[r_f(x)][b]}{\sum_{d=1}^{M} U_f[r_f(x)][b]}.$$

7. The computer implemented method of claim 1, wherein the representation network is configured dynamically based on a dimensionality of the received feature vector.

8. The computer implemented method of claim 1, further comprising communicating the determined posterior probabilities to any of: a display device, a storage device, and a remote device over a network.

9. A Hidden Markov Model based speech recognition system comprising:

a representation network having an input layer of N nodes and $G \geq 2$ intermediate layers of nodes, each intermediate layer having $N_g$ nodes, where $g \in (1, G)$, all edges of all nodes of the input layer being connected to all nodes of a first intermediate layer, all edges of all nodes of each intermediate layer being connected to all nodes of a next successive intermediate layer; and at least one processor executing machine readable program instructions which configure the processor to:

receive a N-dimensional feature vector $x_1, x_2, \ldots, x_N$ with a respective M-dimensional class label vector $b_1, b_2, \ldots, b_M$, where (x, b) represents the $X^{th}$ feature and its label;

initialize the representation network by assigning a feature to each node of the input layer;

train the representation network by computing, for all nodes of each intermediate layer, discriminative features based on features of nodes in a preceding layer;

compute a posterior probability $P_f$ for each (x, b) pair comprising:

discretize features of last intermediate layer $Z^G$ into E-intervals to obtain a discretized layer $\hat{Z}$, where $E \geq 2$;

generate a feature vector $Q=(q_1, q_2, \ldots, q_V)$ by randomly selecting $V \in (1, N_G)$ features from discretized layer $\hat{Z}$;

for f=1 to F, hash Q into $Q_f=(q_1^f, q_2^f, \ldots, q_V^f)$, where $Q_f$ is obtained from the $f^{th}$ hashing, where $F \geq 2$;

determine an equivalent scalar representation for each $Q_f$; and for f=1 to F, determine a posterior probability $P_f$ for each (x, b) pair based on the respective equivalent scalar representation;

use the posterior probabilities to improve classification accuracy of context dependent phonemes in the Hidden Markov Model based speech recognition system; and use the Hidden Markov Model based speech recognition system to recognize speech.

10. The speech recognition system of claim 9, wherein the discriminative feature computed for the $i^{th}$ node of the $g^{th}$ intermediate layer comprises:

$$a_i^g = \sum_{j=1}^{N_g-1} w_{i,j}^g * Z_j^{g-1} + d_i^g$$

$$Z_i^g = \frac{1 - \exp(a_i^g)}{1 + \exp(a_i^g)}$$

where $w_{i,j}^g$ is a weight applied to edges connecting the $i^{th}$ node of the $g^{th}$ intermediate layer to the $j^{th}$ edge of all nodes of a preceding layer, and $d_i^g$ is a bias term.

11. The speech recognition system of claim 9, wherein hashing comprises:

$$h(Q) = \sum_{k=1}^{V} q_k * E^{k-1}.$$

12. The speech recognition system of claim 9, wherein the processor is further configured to:
for f=1 to F, set all locations in an array $U_f[E^V][M]$ equal to 0; and
for f=1 to F, set array location $U_f[r_f(x)][b]$ equal to 1, for each (x, b) pair.

13. The speech recognition system of claim 12, wherein the scalar representation of $Q_f$ for a given f comprises:

$$r_f(x) = \sum_{k=1}^{V} q_k^f * E^{k-1}$$

where $q_k^f$ represents the $k^{th}$ feature of $Q_f$.

14. The speech recognition system of claim 13, wherein the posterior probability for a given (x, b) pair comprises:

$$P_f(x, b) = \frac{U_f[r_f(x)][b]}{\sum_{d=1}^{M} U_f[r_f(x)][b]}.$$

15. The speech recognition system of claim 9, wherein the representation network is configured dynamically based on a dimensionality of the received feature vector.

16. The speech recognition system of claim 9, wherein the processor is further configured to communicate the determined posterior probabilities to any of: a display device, a storage device, and a remote device over a network.

17. A method for modeling a class posterior probability of context dependent phonemes corresponding to a M-dimensional vector using a representation network with an input layer of N nodes and G≥2 intermediate layers of nodes with each intermediate layer having $N_g$ nodes, where g ∈(1, G), all edges of all nodes of the input layer being connected to all nodes of a first intermediate layer, all edges of all nodes of each intermediate layer being connected to all nodes of a next successive intermediate layer, the method comprising:
receiving a N-dimensional feature vector $x_1, x_2, \ldots, x_N$ with a respective M-dimensional class label vector $b_1, b_2, \ldots, b_M$, where (x,b) represents the $x^{th}$ feature and its label;
assigning a feature to each node of the input layer of the representation network;
computing, for all nodes of each intermediate layer, discriminative features based on features of nodes in a preceding layer;
discretizing features of last intermediate layer $Z^G$ into E-intervals to obtain a discretized layer $\hat{Z}$, where E≥2;
generating a feature vector $Q=(q_1, q_2, \ldots, q_V)$ by randomly selecting V ∈(1, $N_G$) features from discretized layer $\hat{Z}$;
for f=1 to F, hashing Q into $Q_f=(q_1^f, q_2^f, \ldots, q_V^f)$, where $Q_f$ is obtained from the $f^{th}$ hashing, where F≥2;
determining an equivalent scalar representation for each $Q_f$;
for f=1 to F, determining a posterior probability $P_f$ for each (x, b) pair based on the determined respective equivalent scalar representation;
modeling a class posterior probability of a M-dimensional vector $y_1, y_2, \ldots, y_M$;
using the modeled class posterior probabilities to improve classification accuracy of context dependent phonemes in a speech recognition system; and
using the speech recognition system to recognize speech.

18. The method of claim 17, wherein computing the discriminative feature for the $i^{th}$ node of the $g^{th}$ intermediate layer comprises:

$$a_i^g = \sum_{j=1}^{N_g-1} w_{i,j}^g * Z_j^{g-1} + d_i^g$$

$$Z_i^g = \frac{1 - \exp(a_i^g)}{1 + \exp(a_i^g)}$$

where $w_{i,j}^g$ is a weight applied to edges connecting the $i^{th}$ node of the $g^{th}$ intermediate layer to the $j^{th}$ edge of all nodes of a preceding layer, and $d_i^g$ is a bias term.

19. The method of claim 17, wherein hashing comprises:

$$h(Q) = \sum_{k=1}^{V} q_k * E^{k-1}.$$

20. The method of claim 17, further comprising:
for f=1 to F, set all locations in an array $U_f[E^V][M]$ equal to 0; and
for f=1 to F, set array location $U_f[r_f(x)][b]$ equal to 1, for each (x, b) pair.

21. The method of claim 20, wherein the scalar representation of $Q_f$ for a given f comprises:

$$r_f(x) = \sum_{k=1}^{V} q_k^f * E^{k-1}$$

where $q_k^f$ represents the $k^{th}$ feature of $Q_f$.

22. The method of claim 21, wherein determining posterior probability $P_f$ for a given (x, b) pair comprises:

$$P_f(x, b) = \frac{U_f[r_f(x)][b]}{\sum_{d=1}^{M} U_f[r_f(x)][b]}.$$

23. The method of claim 17, wherein the representation network is configured dynamically based on a dimensionality of the received feature vector.

24. The method of claim 17, further comprising communicating the determined posterior probabilities to any of: a display device, a storage device, and a remote device over a network.

25. A system for modeling a class posterior probability of context dependent phonemes corresponding to a M-dimensional vector, the system comprising:
a representation network having an input layer of N nodes and G≥2 intermediate layers of nodes, each intermediate layer having $N_g$ nodes, where g ∈(1, G), all edges of all nodes of the input layer being connected to all nodes of a first intermediate layer, all edges of all nodes of each intermediate layer being connected to all nodes of a next successive intermediate layer; and
at least one processor executing machine readable program instructions which configure the processor to:
receive a N-dimensional feature vector $x_1, x_2, \ldots, x_N$ with a respective M-dimensional class label vector $b_1, b_2, \ldots, b_M$, where (x, b) represents the $x^{th}$ feature and its label;

initialize the representation network by assigning a feature to each node of the input layer;

train the representation network by computing, for all nodes of each intermediate layer, discriminative features based on features of nodes in a preceding layer;

compute a posterior probability $P_f$ for each (x, b) pair comprising:

discretize features of last intermediate layer $Z^G$ into E-intervals to obtain a discretized layer $\hat{Z}$, where E≥2;

generate a feature vector $Q=(q_1, q_2, \ldots, q_V)$ by randomly selecting $V \in (1, N_G)$ features from discretized layer $\hat{Z}$;

for f=1 to F, hash Q into $Q_f=(q_1^f, q_2^f, \ldots, q_V^f)$, where $Q_f$ is obtained from the $f^{th}$ hashing, where F≥2;

determine an equivalent scalar representation for each $Q_f$; and for f=1 to F, determine a posterior probability $P_f$ for each (x, b) pair based on the respective equivalent scalar representation;

model a class posterior probability of a M-dimensional vector $y_1, y_2, \ldots, y_M$;

use the modeled class posterior probabilities to improve classification accuracy of context dependent phonemes in a speech recognition system; and use the speech recognition system to recognize speech.

26. The system of claim 25, wherein the discriminative feature computed for the $i^{th}$ node of the $g^{th}$ intermediate layer comprises:

$$a_i^g = \sum_{j=1}^{N_g-1} w_{i,j}^g * Z_j^{g-1} + d_i^g$$

$$Z_i^g = \frac{1 - \exp(a_i^g)}{1 + \exp(a_i^g)}$$

where $w_{i,j}^g$ is a weight applied to edges connecting the $i^{th}$ node of the $g^{th}$ intermediate layer to the $j^{th}$ edge of all nodes of a preceding layer, and $d_i^g$ is a bias term.

27. The system of claim 25, wherein hashing comprises:

$$h(Q) = \sum_{k=1}^{V} q_k * E^{k-1}.$$

28. The system of claim 25, wherein the processor is further configured to:

for f=1 to F, set all locations in an array $U_f[E^V][M]$ equal to 0; and for f=1 to F, set array location $U_f[r_f(x)][b]$ equal to 1, for each (x, b) pair.

29. The system of claim 28, wherein the scalar representation of $Q_f$ for a given f comprises:

$$r_f(x) = \sum_{k=1}^{V} q_k^f * E^{k-1}$$

where $q_k^f$ represents the $k^{th}$ feature of $Q_f$.

30. The system of claim 29, wherein the posterior probability for a given (x, b) pair comprises:

$$P_f(x, b) = \frac{U_f[r_f(x)][b]}{\sum_{d=1}^{M} U_f[r_f(x)][b]}.$$

31. The system of claim 25, wherein the representation network is configured dynamically based on a dimensionality of the received feature vector.

32. The system of claim 25, wherein the processor is further configured to communicate the determined posterior probabilities to any of: a display device, a storage device, and a remote device over a network.

* * * * *